US00RE34417E

United States Patent [19]

Werner et al.

[11] E Patent Number: Re. 34,417

[45] Reissued Date of Patent: Oct. 26, 1993

[54] MOWER HAVING SEPARATELY REPLACEABLE BEARING SUBASSEMBLY

[75] Inventors: Anton Werner; Horst Neuerburg, both of Saverne, France

[73] Assignee: Kuhn S.A., Saverne, France

[21] Appl. No.: 802,217

[22] Filed: Dec. 4, 1991

Related U.S. Patent Documents

Reissue of:

[64] Patent No.: 4,365,462
Issued: Dec. 28, 1982
Appl. No.: 228,109
Filed: Jan. 26, 1981

[30] Foreign Application Priority Data

Feb. 4, 1980 [FR] France ..... 80 02639

[51] Int. Cl.[5] ..... A01D 34/82

[52] U.S. Cl. ..... 56/255; 56/6; 56/295

[58] Field of Search ..... 56/6, 255, 295, 17.5, 56/136

[56] References Cited

U.S. PATENT DOCUMENTS

| | | | |
|---|---|---|---|
| 2,625,784 | 1/1953 | Kelsey . | |
| 3,507,102 | 4/1970 | Kline et al. . | |
| 3,708,966 | 1/1973 | Reber | 56/6 |
| 4,197,692 | 4/1980 | Weber | 56/13.6 |
| 4,199,922 | 4/1980 | Lely | 56/295 |
| 4,202,243 | 5/1980 | Leonhardt | 411/501 |
| 4,215,526 | 8/1980 | Lely | 56/295 |
| 4,235,069 | 11/1980 | Oosterling et al. | 56/295 |
| 4,238,917 | 12/1980 | Oosterling et al. | 56/192 |

FOREIGN PATENT DOCUMENTS

| | | |
|---|---|---|
| 2522479 | 5/1974 | Fed. Rep. of Germany . |
| 2420398 | 7/1974 | Fed. Rep. of Germany . |
| 2445178 | 4/1975 | Fed. Rep. of Germany . |
| 2552347 | 7/1976 | Fed. Rep. of Germany . |
| 2822686 | 11/1978 | Fed. Rep. of Germany . |
| 2825665 | 1/1979 | Fed. Rep. of Germany . |
| 2114130 | 6/1972 | France . |
| 2317869 | 11/1977 | France . |
| 2372989 | 8/1978 | France . |
| 48-92740 | 12/1973 | Japan . |
| 53-149525 | 12/1978 | Japan . |
| 6604670 | 10/1966 | Netherlands . |
| 7409899 | 1/1976 | Netherlands . |
| 456223 | 7/1968 | Switzerland . |
| 702735 | 1/1954 | United Kingdom . |
| 1480797 | 7/1971 | United Kingdom . |
| 1241532 | 8/1971 | United Kingdom . |
| 1249638 | 10/1971 | United Kingdom . |
| 2023393 | 1/1980 | United Kingdom . |
| 2033198 | 5/1980 | United Kingdom . |
| 1594318 | 7/1981 | United Kingdom . |

OTHER PUBLICATIONS

ZAGA Zagadisc-FIG. BGD-1.650, 1 page (date unknown).

Parts Book, Massey-Ferguson, MF51-1730670M1, May, 1970, pp. 1-19.

Sperry New Holland Disc Mowers-Models 442 & 462, Oct., 1979, pp. 1-4.

Sasaki Disc Mower AM-2400D-pp. 1-15, (date unknown).

ZAGA Zagadisc-44 pages (date unknown).

TAARUP-SE 2100, SE 1650-pp. 1-68, Apr. 1973.

ZAGA Zagadisc-Instruction Manual and Spare Parts-27 pages (date unknown).

"Dubbles Taschenbuch für den Maschinenbau", 1958, pp. 608 and 609.

*Primary Examiner*—Terry Lee Melius

*Attorney, Agent, or Firm*—Oblon, Spivak, McClelland, Maier & Neustadt

[57] ABSTRACT

In a mower having a frame and a plurality of rotatable disks supported by the frame, a driving device is operable to rotate each disk, and includes a driving wheel associated with each disk, and a shaft in driven connection with a corresponding driving wheel. A coupling in driven connection with a corresponding shaft for coupling a corresponding disk to the corresponding shaft is provided, and an antifriction bearing guides the corresponding shaft. Each driving wheel and its corresponding shaft, coupling and anti-friction bearing constitutes a separately replaceable subassembly in the mower.

15 Claims, 3 Drawing Sheets

MOWER HAVING SEPARATELY REPLACEABLE BEARING SUBASSEMBLY

Matter enclosed in heavy brackets [ ] appears in the original patent but forms no part of this reissue specification; matter printed in italics indicates the additions made by reissue.

BACKGROUND OF THE INVENTION

This invention relates to mowers with disks at least one of which is driven by driving means supported by the frame.

Mowers of this kind are generally constituted by a frame extending longitudinally at right angles to the direction in which the mower moves, when it is operating. The frame houses driving means, or transmission elements to drive the disks. These elements generally take the form of pinions or wheels, whose teeth are either straight, helical or bevel-cut. Some of those pinions or wheels are directly connected to the disks of the mower by means of shafts or other driving elements.

For this purpose, it is known for the pinions secured to a shaft to be forged; after machining, these undergo heat treatment before being grinded. This production method, which is perfectly satisfactory from the functional standpoint, has the disadvantage of being very costly.

There are other ways of assembling a pinion or a driving wheel, such as a gear wheel, to its shaft, for example, by using a screw connection. This method is also costly and, in addition, has the disadvantage of being unreliable because of the risk of the screw becoming loose.

In addition, the shaft mentioned above is guided in a bearing block with the aid of antifriction bearings, such as ball bearings, whose assembly on the shaft and in its bearing block demands a lot of care, because of the high speed at which each shaft has to drive its associated disk. Basically, fitting such bearings is not within the capability of the user of such mowers; in the event of breakdowns caused by these components, this means that the machine has to be taken to a specialist so that the required repairs can be made. This takes time and generally deprives the user of the mower of its services, at a time when he urgently needs them, in particular to take advantage of the optimum conditions of maturity of the fodder to be mowed, and of favorable weather conditions for harvesting.

SUMMARY OF THE INVENTION

The present invention makes it possible to overcome the disadvantages named above, and relates to a mower whose bearing sub-assemblies are inexpensive and can be easily replaced by the use of the machine without taking the mower out of service for a lengthy period.

For this purpose, the pinion or the gear wheel and the shaft of each bearing block of the mower with disks driven by corresponding driving wheels disposed below respective disks constitute separate elements, and are assembled in a permanent fashion with the bearings used to guide each of the shafts in its bearing block. In the event of any required repair, the user of the machine may himself replace a bearing sub-assembly in the mower without having to follow special fitting instructions, particularly as regards guaranteed bearing operating clearances.

In accordance with one preferred variant of the invention, the bearings serving to guide the shaft of each bearing block are located between the pinion or gear wheel and a sleeve member surrounding the shaft, the sleeve member and gear wheel being permanently secured to the shaft.

In this way, the bearing block complete with its shaft, its pinion or gear wheel, its bearings and its sleeve member can be sold as a preassembled and preset replacement subassembly.

In order to make the production of the subassembly less expensive, and to avoid any distortion during its fitting, the invention provides for the pinion or the gear wheel and sleeve member to be fixed to the shaft by means of permanent deformation of the shaft; thus the pinion or the gear wheel and the sleeve are crimped onto the shaft on each side of the bearings.

BRIEF DESCRIPTION OF THE DRAWINGS

Further features and advantages of the invention will become apparent below in the description, which is in no way limitative, of an embodiment example of the invention, and with reference to the attached drawings in which.

DESCRIPTION OF THE PREFERRED EMBODIMENTS

Figure 1:
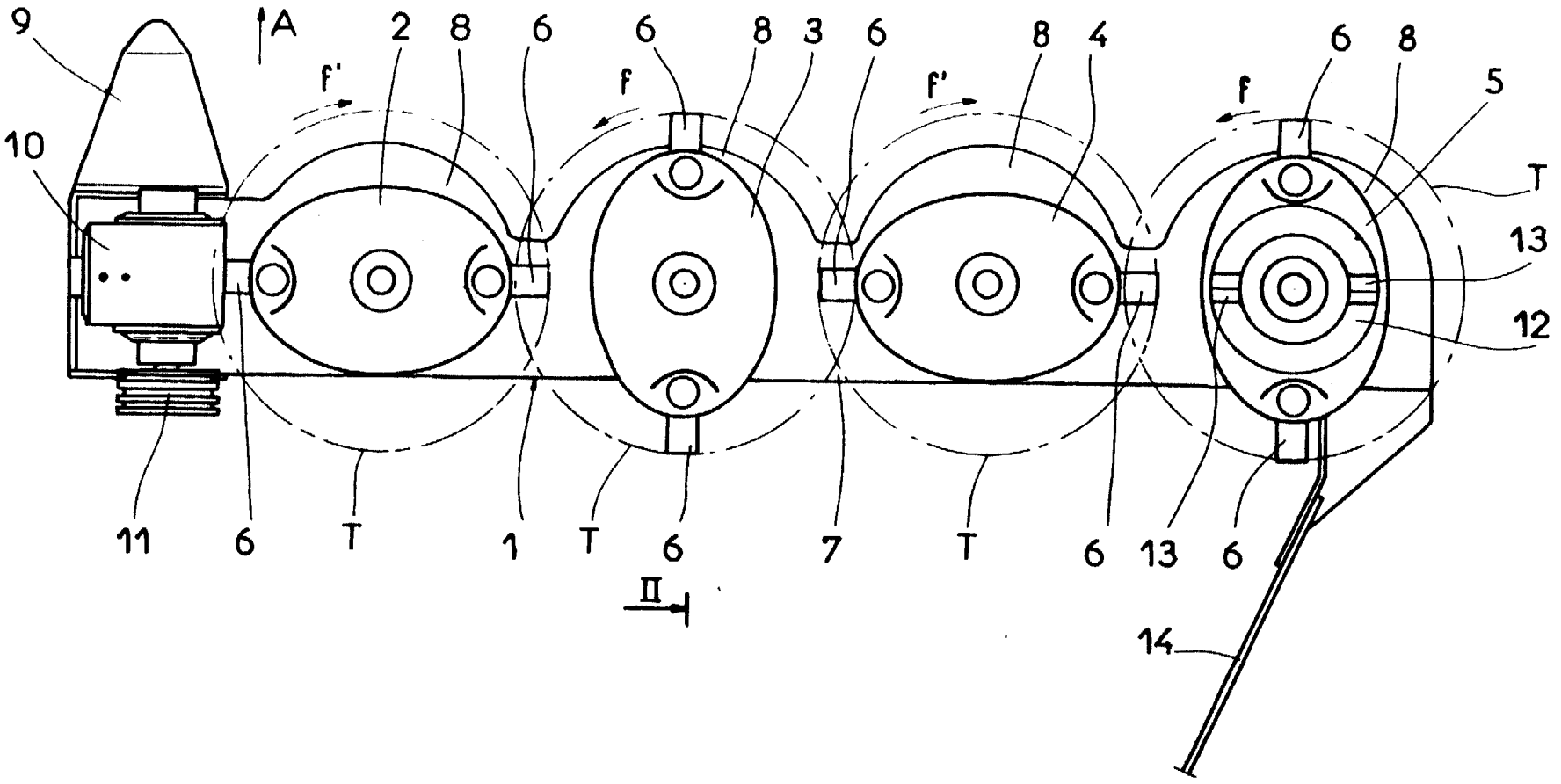
FIG. 1 is a top plan view of a mower equipped in accordance with the invention;.

As shown in FIG. 1, the mower 1 is of the kind which includes a plurality, of, for example, four cutter element supports 2, 3, 4 and 5 having the shape of oval disks. Each of the disks, 2, 3, 4 and 5 is fitted with two diametrically opposed cutters 6, freely articulated around the vertical axis of the device and securing the cutters to each of the disks 2, 3, 4 or 5, respectively. The cutters 6 extend radially outwardly under the action of the centrifugal force, when the disks 2, 3, 4 and 5 are rotating in the direction of the arrows f and f'. The cutters 6 then follow paths T extending beyond the leading edge of the frame 7 at the front of the mower, when viewed in the direction of its forward motion A. This leading edge has an undulating profile, the circular segments 8 of which have a radius greater than that defined by the path of the disks 2, 3, 4 and 5, while being smaller than the radius defined by the path T of the cutter 6. The segments 8 thus protect the disks 2 through 5 against any impact with obstacls which the mower might encounter while it is operating. The cutters 6 are vulnerable to such impacts. However, being articulated, they are able to be retracted, passing underneath the disks 2, 3, 4 or 5, which reduces the risk of damage to the cutters.

In FIG. 1 it can also be seen that at one of its ends the mower is fitted with a shoe 9 extending below the frame 7 of the machine, and allowing the machine to slide over the ground whilst preventing wear on the bottom of the frame 7. Above the shoe 9, an angular drive unit 10 is secured to the upper part of the frame 7. This drive unit, serving to drive the transmission elements housed in the frame 7 for the purpose of rotating the disks 2, 3, 4 and 5, is driven by a grooved pulley 11. The belts designed to run in the grooves are driven by another pulley (not shown) which may be connected directly to the power take-off of a (non-illustrated) tractor through a transmission shaft.

Without exceeding the limits of the invention, the transmission elements can be driven with the aid of other means, such as a shaft connected directly to one of the disks 2, 3, 4 or 5.

At the other end of the mower 1, the end disk 5 is surmounted by an element in the form of a truncated cone 12 including ribs 13 extending outwardly. The function of the element 12 is to ensure clear separation between any fodder that has already been cut, and any fodder still standing while the machine is operating.

Moreover, the end of the machine also includes a windrowing board 14 making it possible to deflect the stream of fodder cut by the disks 4 and 5, so as to bring it closer to the windrow formed by the disks 2 and 3.

Figure 2:
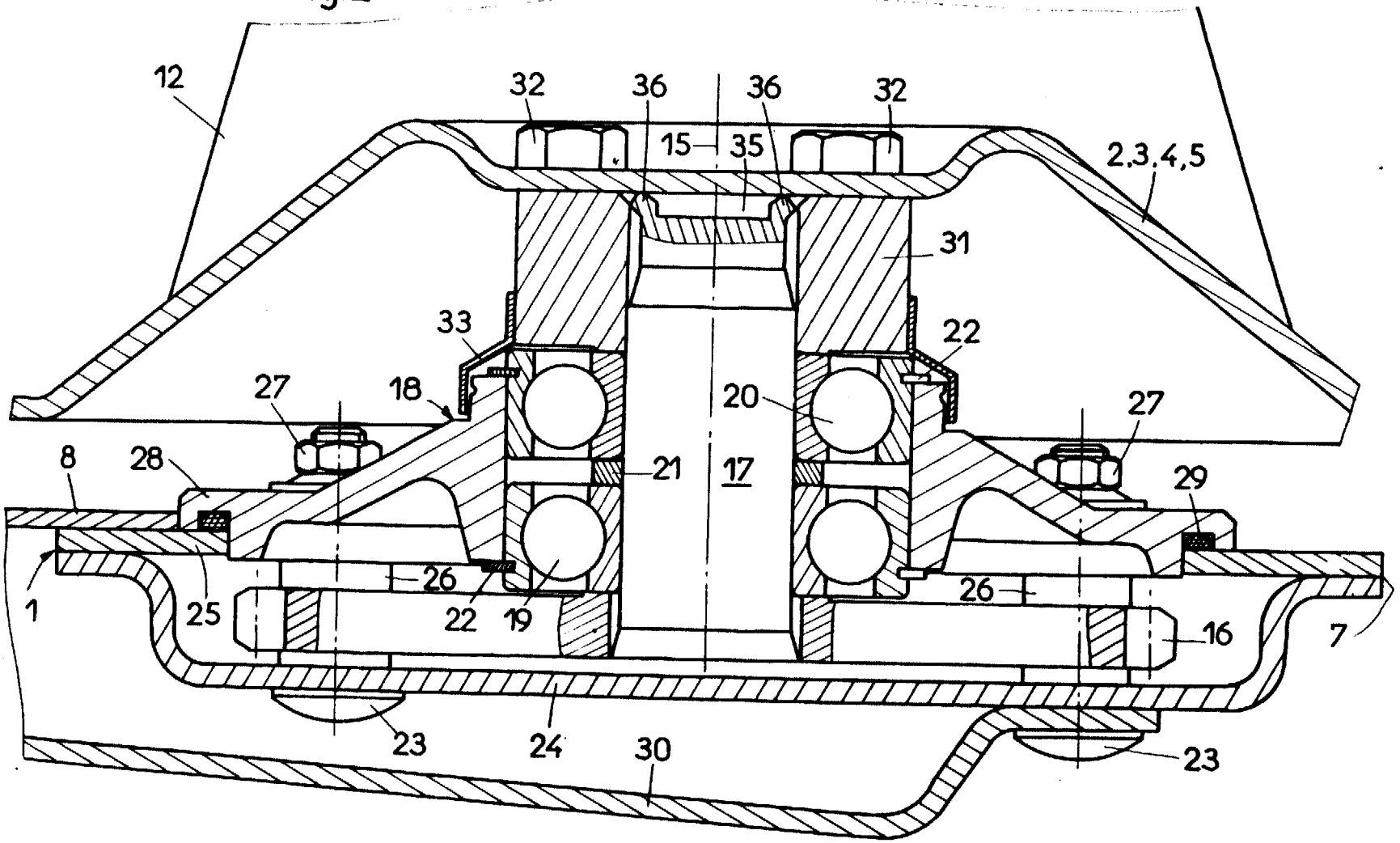
FIG. 2 is an elevational vertical section, through II—II of FIG. 1, through the axis of one of the supports for the cutting elements of the mower.

As has been stated above, the disks 2, 3, 4 and 5 are rotated in the direction of the arrows f and f' about their axis 15, which is upright when the machine is in its operating position. According to one embodiment example of the invention, the transmission elements driving the disks 2 to 5 are constituted by a series of driving wheels, such as gear wheels 16 meshing with one another, and extending over the entire length of the frame 7. As can be seen in FIG. 2, some of these gear wheels 16 are individually connected directly to a disk 2, 3, 4 or 5 with the aid of a shaft 17 guided in a bearing means, such as a bearing block 18, with the aid of two antifriction bearings 19 and 20 separated by a spacer 21, and secured to the bearing block 18 with the aid of a circlip 22.

The bearing blok 18 of each of the disks 2 through 5 is secured to the frame 7 with the aid of screws 23 extending through a lower cover 24 and upper cover 25 of the frame 7, and passing through the spacer 26 disposed between the lower cover 24 and the upper cover 25. Nuts 27 cooperating with the screws 23 bear on the pedestal 28 of the bearing blocks 18. The bearing blocks 18 are centered in the base 25 of the frame 7, and have a groove in which a seal 29 ensures that the connection between each bearing block 18 and the frame 7, which contains a certain amount of oil for lubricating the transmission elements, does not leak. The part-circular segments 8 extending at the front of the machine to protect the disks 2 through 5 are secured to the upper cover 25 of the frame 7 with the aid of, for example, screws, or by welding.

A part of screws 23 also serves to secure a skid 30 underneath each disk 2, 3, 4 and 5 to the frame 7. The skid 30 is arranged to slide over the ground, while the machine is operating, and to prevent wear of the lower cover 24 of the frame 7. Preferably, the skids 30 are respectively linked to the part-circular segments 8 protecting each of the disks 2 through 5.

The shaft 17 of each of the gear wheels 16 extends upwardly above each of the bearing blocks 18 to allow fitting of coupling means, such as a sleeve member 31 provided with a central bore, onto which member 31 the disks 2, 3, 4 or 5 can be secured with the aid of screws 32. A deflector 33 is secured to the base of each sleeve member 31, the deflector 33 covering the top of the bearing block 18 with the object of protecting the bearings 19 and 20 against ingress of dirt.

Figure 3:
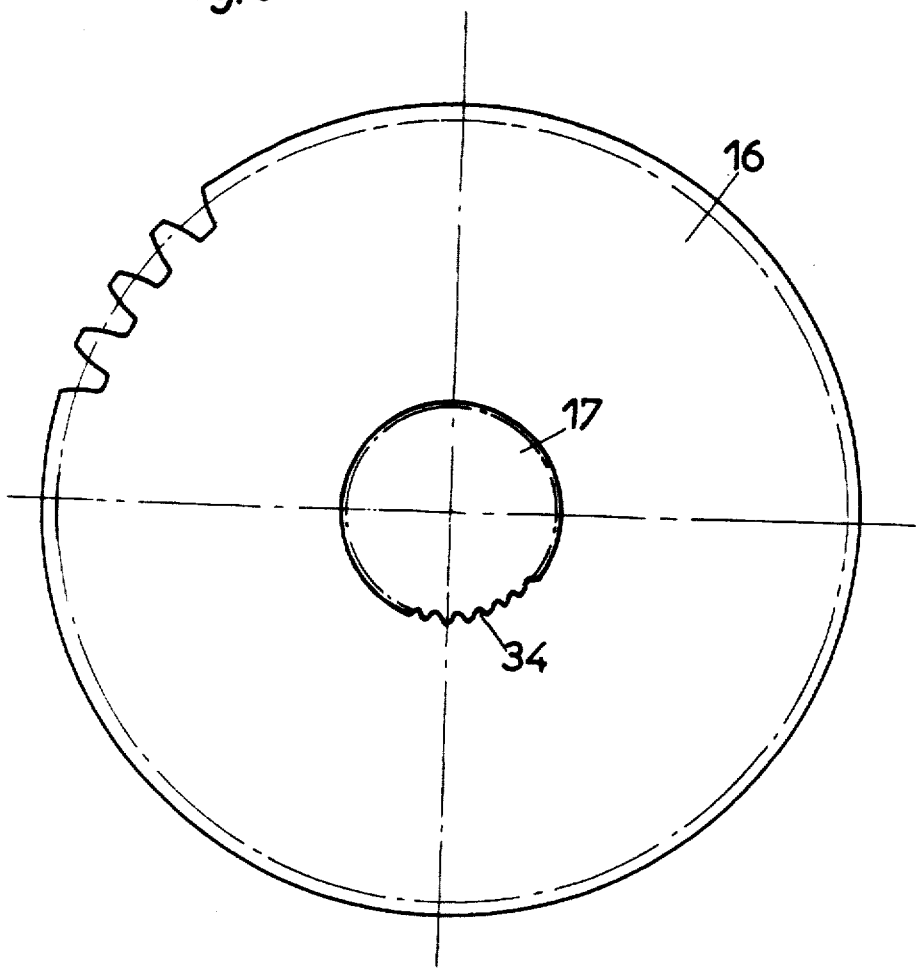
FIG. 3 is a bottom plan view of one of the transmission elements of the mower assembled with a shaft on which one of the supports for the cutting elements is to be fitted.

A description will be given below of the manner in which the gear wheel 16, the shaft 17, the bearings 19 and 20 and the sleeve member 31 are assembled. When manufactured, the gear wheels 16—made of special steel—are provided each with a coaxial bore into which the shaft 17 is introduced. Advantageously, the gear wheel 16 has an interior toothed bore 34, as can be seen from FIG. 3. To assemble the two parts 16 and 17, at least an outer skin of the smooth end of the shaft 17 introduced into the bore of each gear wheel 16, is deformed in such a way that the metal from which the shaft 17 is made, fills the spaces in the toothed bore 34 of the gear wheel 16. This produces a firm connection between the shaft 17 and the gear wheel 16, particularly in the direction of rotation. Once this permanent assembly has been put together, the antifriction bearing 19, fitted with its circlip 22 is mounted on the shaft 17. Then the spacer 21 is slipped onto it, followed by the second anti-friction bearing 20. Then each bearing block 18 is fitted over the bearings 19 and 20, and the circlip 22 is fitted in place in the bearing 20. The sleeve member 31 is then introduced onto each of the shafts 17 and is made to rest on an internal ring of the bearing 20. Each sleeve member 31 may have an interior toothed bore similar to that of the bore 34 in each gear wheel 16. Thus, when the skin of the upper part of the shaft 17—which is smooth prior to its assembly with the sleeve member 31—is distorted, the metal is forced into the spaces between the teeth of the interior toothed bore 34 of the sleeve member 31. This crimped assembly results in a permanent connection of the shaft 17 with the sleeve member 31.

The firm connection between the shaft 17 and the sleeve member 31 is further strengthened by providing a recess 35 in the upper end of the shaft 17. Once the sleeve member 31 and the shaft 17 have been assembled, the circumferential wall remaining due to the hollowing out of the shaft 17 can be deformed with the aid of a ball-shaped tool, which, having a diameter greater than that of the recess 35, can be forced down hard against the circumferential wall. This procedure thus additionally clamps the shaft 17 onto the sleeve member 31.

In addition to the connection between the shaft 17 and the gear wheel 16 obtained by deformation of the skin of the shaft 17, the shaft 17 can be clamped or riveted to the wheel 16 through the distortion of the walls of a (non-illustrated) recess provided in its lower end. This clamping operation is similar to that used between the sleeve member 31 and the shaft 17.

In accordance with one variant of the invention, the shaft 17 can be provided with a shoulder in its upper part and can include (non-illustrated) fixing devices for the disks 2 through 5. In this variety, the member 31 and the shaft 17 constitute a single unit.

The bearing subassembly for the mower, including the shaft 17, and the sleeve member 31 in a single piece, is assembled in the following manner. First, the bearing 20 is fitted onto the shaft 17, resting against a shoulder of the shaft 17, and then the spacer 21 is slipped on, followed by the addition of the second bearing 19. Then the gear wheel 16 is fitted and crimped onto the shaft 17.

Various assemblies can be proposed for the bearings 19 and 20 within the scope of the invention. Thus, the bearings 19 and 20 can be of a different kind than are shown in FIG. 2. The bearings may be of the oblique-contact ball type, taper-roller type, or needle-type. The bearing block 18 may even serve as an external ring for the bearings 19 and 20.

The assembly described above for the various elements in the bearing block 18 allows the bearings 19 and 20 to be secured thereto with great precision, due to the aforenoted crimping operations, which can be carried out rapidly. Thus, it is possible to stock as spares subassemblies or units comprising the gear wheel 16, the shaft 17, the bearing 19 and 20 with their spacer 21, and the sleeve member 31; alternately the bearing bock 18 can also form a part of the subassembly when, for example, it serves as an external ring for the bearings 19 and 20. These subassemblies do not pose any difficulties with regard to their assembly on the mower, because it is sufficient to unscrew the nuts 27 to permit rapid—and thus inexpensive—replacement of a damaged subassembly. However, any attempt to disassemble the subassembly or unit will only cause damage, for example, to the gear wheel 16, the shaft 17, and the sleeve member 31, so that the unit can only be removed from the mower as a whole without causing damage to any of its parts. On the other hand, the unit can be removed without any need to remove the frame from the mower. In fact, the gear wheels 16 have an external diameter smaller than the diameter of the hole provided in the upper cover 25 of the frame 7, the external dimensions of pedestal 28 of the bearing block 18 being greater than the diameter of the hole provided in the upper cover 25, so that it is not necessary to remove the upper cover 25 from the frame 7.

As has been described above, each gear wheel 18 and each sleeve member 31 are crimped onto a shaft 17. This solution is preferable to welding, because the use of welding can cause a certain amount of distortion. Furthermore, the parts to be assembled are generally made of special steel, which has poor welding characteristics.

It is quite obvious that various improvements, modifications or additions can be made to the embodiment example described hereinabove, without thereby exceeding the scope of the present invention.

It will be noted in particular that the invention applies to mowers with various types of transmission elements. Thus, the invention is not limited to the fitting of shafts 17 to straight gear wheels 16. The shafts 17 may also be fitted in the manner indicated above in the bore of bevel-cut wheels or any other transmission element.

I claim:

1. In a mower having a frame and a plurality of subassemblies supported by said frame, each subassembly including a rotatable disk, in combination at least one of said subassemblies forming a unit comprising driving means, including a driving gear member operable to rotate the disk of said unit, a shaft member in driven connection with said driving gear member, a coupling member in driven connection with said shaft member for coupling said disk to said shaft member, and antifriction bearing means for guiding said shaft member, said unit being removable from said mower free from damage to any of its members only if removed as a whole.

2. The mower as claimed in claim 1, wherein said antifriction bearing means are disposed between said coupling means and said driving wheel member in each subassembly.

3. The mower as claimed in claim 2, wherein said frame has a plurality of openings, and further comprising a plurality of covers covering said openings, respectively, and wherein each driving gear member has a diameter smaller than the largest width of a corresponding opening, so that the driving gear member of the corresponding subassembly can pass through the corresponding opening, a corresponding cover protecting the corresponding driving gear member, the external dimensions of the corresponding cover being greater than the size of a corresponding opening.

4. The mower as claimed in claim 1, wherein said disks are operatively disposed in a generally horizontal plane, and wherein the shaft member of each subassembly is operatively disposed below a corresponding disk, and a corresponding driving gear member is operatively disposed below the corresponding shaft member.

5. The mower as claimed in claims 1, 2, 3 or 4, wherein the coupling member of each subassembly comprises a sleeve member having a central bore, wherein the driving gear member thereof has a coaxial bore, and wherein at least one of the sleeve and driving gear members of said unit has an interior bore formed with teeth, said unit, being assembled by passing said shaft through said one of said sleeve and driving gear members, whereby the circumference of at least a portion of said shaft is deformed by said teeth of said bore so as to be firmly connected to said one of said sleeve and driving gear members.

6. In a mower having a frame and a plurality of subassemblies supported by said frame, each subassembly including a rotatable disk, in combination at least one of said subassemblies forming a unit comprising driving means, including a driving gear member operable to rotate the disk of said unit, a shaft member in driven connection with said driving gear member, a coupling member in driven connection with said shaft member for coupling said disk to said shaft member, and bearing means for guiding said shaft member including antifriction means and a bearing block externally supporting said antifriction bearing means, said unit being removable from said mower free from damage to any of its members only if removed as a whole.

7. The mower as claimed in claim 6, wherein said antifriction bearing means are disposed between said coupling member and said driving gear member.

8. The mower as claimed in claim 6, wherein said frame has a plurality of openings, and further comprising a plurality of covers covering said openings, respectively, and wherein each driving gear member has a diameter smaller than the largest width of a corresponding opening, so that the driving gear member of the corresponding subassembly can pass through the corresponding opening, a corresponding cover protecting the corresponding driving gear member, the external dimensions of the corresponding cover being greater than the size of a corresponding opening.

9. The mower as claimed in claim 6, wherein said disks are operatively disposed in a generally horizontal plane, and wherein the shaft member of each unit is operatively disposed below a corresponding disk, and a corresponding driving gear member is operatively disposed below the corresponding shaft member.

10. The mower as claimed in claims 6, 7, 8, or 9, wherein the coupling member of each unit comprises a sleeve member having a central bore, wherein the driving gear member thereof has a coaxial bore, and wherein at least one of said sleeve and driving gear members of said unit has an interior bore formed with teeth, said unit being assembled by passing said shaft through said one of said sleeve and driving gear members, whereby the circumference of at least a portion of said shaft is deformed by said teeth of said bore so as to be firmly connected to said one of said sleeve and driving gear members.

11. In a mower having a frame and a plurality of subassemblies supported by said frame, each subassembly including a rotatable disk, in combination at least one of said subassemblies forming a unit comprising driving means, including a driving gear member operable to rotate the disk of said unit, a shaft member in driven connection with said driving gear member, coupling means in driven connection with said shaft member for coupling said disk to said shaft member, and bearing means for guiding said shaft member including antifriction bearing means and a bearing block externally supporting said antifriction bearing means, said [means and said members] *driving means, said shaft member, said coupling means, and said bearing means* constituting a unit which is replaceable without disassembly *of the unit* and free from any need to disassemble at least a portion of the frame of the mower.

12. In a mower having a frame and a plurality of individual subassemblies supported by said frame, each individual subassembly including a rotatable disk in combination at least one of said subassemblies comprising driving means, including a driving gear member operable to rotate the disk of said one of said subassemblies, a shaft in driven connection with said driving [ger] *gear* member, a sleeve member in driven connection with said shaft for coupling said disk to said shaft, bearing means for guiding said shaft, and including antifriction bearing means and a bearing block externally supporting said antifriction bearing means, at least one member having an interior bore formed with teeth and being assembled with said shaft by passing said shaft therethrough, whereby the circumference of at least a portion of said shaft is deformed by the teeth of said bore so as to be frrmly connected to said one member.

*13. In a mower having a frame and a plurality of subassemblies supported by said frame, each subassembly including a rotatable disk,*

*in combination*

*at least one of said subassemblies forming a unit comprising driving means, including a driving gear member operable to rotate the disk of said unit,*

*a shaft member in driven connection with said driving gear member,*

*a coupling member in driven connection with said shaft member for coupling said disk to said shaft member, and*

*bearing means for guiding said shaft, and including antifriction bearing means and a bearing block externally supporting said antifriction bearing means,*

*said driving means, said shaft member, said coupling means, and said bearing means constituting a unit which is replaceable without disassembly of the unit and free from any need to disassemble at least a portion of the frame of the mower,*

*said rotatable disk being replaceable without disassembly of said unit.*

*14. In a mower having a frame and a plurality of subassemblies supported by said frame, each subassembly including a rotatable disk,*

*in combination*

*at least one of said subassemblies forming a unit comprising driving means, including a driving gear member operable to rotate the disk of said unit,*

*a shaft member in driven connection with said driving gear member,*

*coupling means in driven connection with said shaft member for coupling said disk to said shaft member, and*

*bearing means for guiding said shaft, and including antifriction bearing means and a bearing block externally supporting said antifriction bearing means,*

*said driving means, said shaft member, said coupling means, and said bearing means constituting a unit which is replaceable without disassembly of the unit and free from any need to disassemble at least a portion of the frame of the mower,*

*wherein said rotatable disk is operatively disposed in a generally horizontal plane, and*

*wherein said coupling means is operatively disposed below said rotatable disk.*

*15. In a mower having a frame and a plurality of subassemblies supported by said frame, each subassembly including a rotatable disk,*

*in combination*

*at least one of said subassemblies forming a unit comprising driving means, including a driving gear member operable to rotate the disk of said unit,*

*a shaft member in driven connection with said driving gear member,*

*coupling means in driven connection with said shaft member for coupling said disk to said shaft member, and*

*bearing means for guiding said shaft, and including antifriction bearing means and a bearing block externally supporting said antifriction bearing means,*

*said driving means, said shaft member, said coupling means, and said bearing means constituting a unit which is replaceable without disassembly of the unit and free from any need to disassemble at least a portion of the frame of the mower,*

*wherein said coupling means is disposed between said rotatable disk and said bearing means.*

* * * * *